United States Patent [19]
Binard et al.

[11] 3,730,209
[45] May 1, 1973

[54] VENT FOR LIQUID DRAINAGE SYSTEM

[75] Inventors: William J. Binard; John F. Dye, both of Barrington, Ill.

[73] Assignee: The Kendall Company, Boston, Mass.

[22] Filed: June 2, 1971

[21] Appl. No.: 149,315

[52] U.S. Cl. ............... 137/217, 128/349 R, 285/197, 285/423
[51] Int. Cl. ............................................. F16k 45/00
[58] Field of Search .................... 128/295, 350, 349; 285/197, 287, 423, DIG. 16, DIG. 22; 137/217, 318

[56] References Cited

UNITED STATES PATENTS

| 3,419,009 | 12/1968 | Ericson | 137/217 X |
| 3,429,314 | 2/1969 | Ericson | 128/349 R |
| 2,690,744 | 10/1954 | Wallace | 128/6 |
| 2,955,595 | 10/1960 | Semple | 137/318 X |

FOREIGN PATENTS OR APPLICATIONS

| 1,026,000 | 4/1966 | Great Britain | 285/197 |

*Primary Examiner*—Henry T. Klinksiek
*Attorney*—Robert D. Chodera

[57] ABSTRACT

A vent for a liquid drainage system having a drainage lumen, including an air chamber, a one-way valve connected to the chamber, and a passageway connected between the chamber and drainage lumen. The valve opens to permit the passage of air into the drainage lumen, and closes to prevent passage of fluid from the chamber. The liquid, which drains in the lumen past the passageway, refluxes into the passageway responsive to a positive pressure condition in the lumen relative to the pressure in the chamber, and the refluxing liquid flow forces air from the passageway into the chamber to close the valve. Air is confined in the chamber by the closed valve, and the liquid flow compresses the confined air in the chamber to develop a resistive pressure in the chamber which prevents the liquid from entering the chamber and contacting the valve.

24 Claims, 13 Drawing Figures

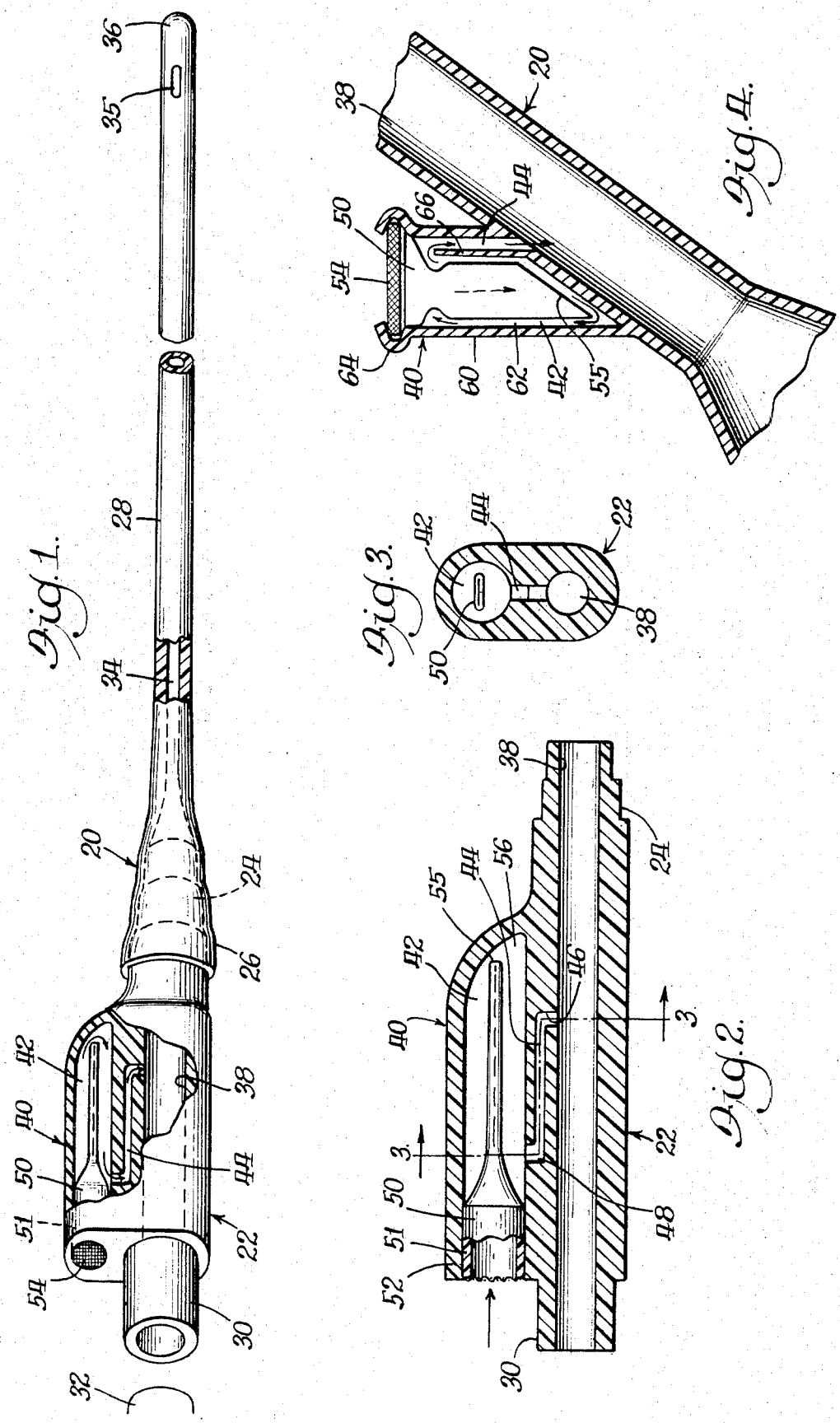

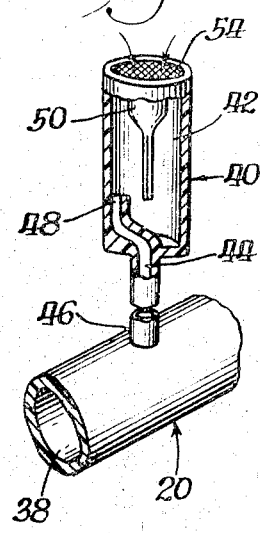
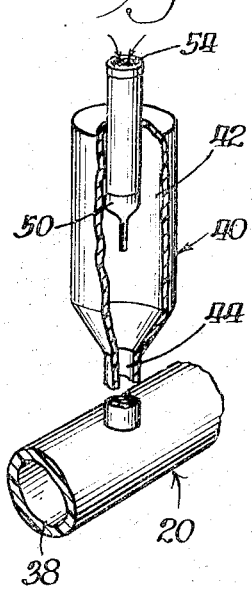
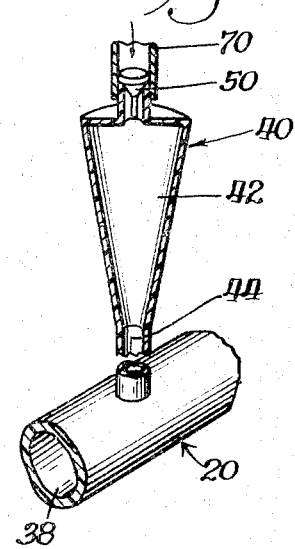
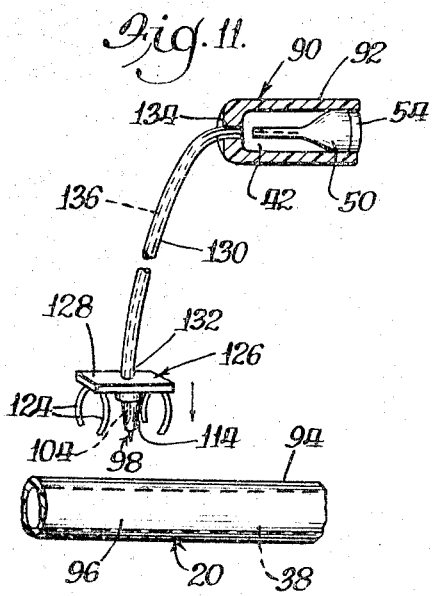
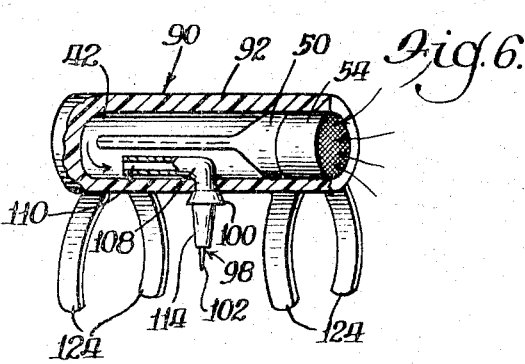
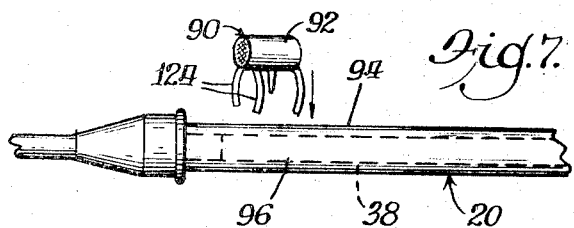
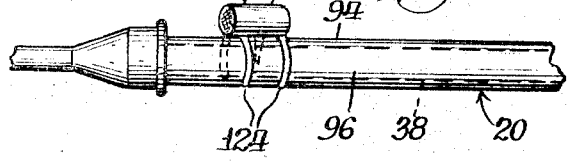
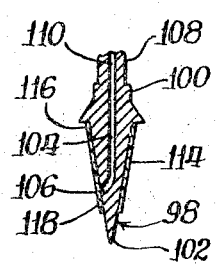
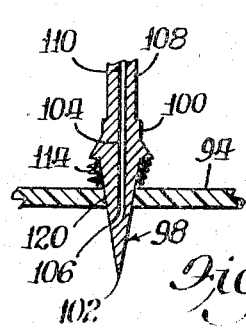

VENT FOR LIQUID DRAINAGE SYSTEM

BACKGROUND OF THE INVENTION

1. Field of the Invention

This invention relates to liquid drainage systems, and more particularly to a protective device for a valve and filter in a drainage vent.

2. Description of the Prior Art

It is known that in systems for the drainage of fluids from the body, such as indwelling catheters, a negative pressure may be created in such systems which has a deleterious effect on the body. To alleviate this result, Ericson U.S. Pat. No. 3,429,314 discloses a vented drainage system which prevents buildup of a negative pressure, and shows a filter unit positioned in the vent to prevent the passage of bacteria into the system. However, if fluids in the system contact the filter unit, it may be rendered inoperable, and Ericson U.S. Pat. No. 3,419,009 teaches the use of a valve to protect the filter.

Andersen U.S. Pat. No. 3,114,373 relates to a gastro-intestinal sump tube assembly having an adapter tube which may draw in ambient air, and check valves in urinal collection bags are disclosed in Evans U.S. Pat. No. 2,883,985 and the British Pat. No. 1,128,186. Reiss et al. U.S. Pat. No. 3,526,218 shows a closed end manometer having a passageway of capillary dimension and a chamber to measure fluid pressures.

Although vented drainage systems, such as proposed by Ericson U.S. Pat. No. 3,419,009, sustain the lifetime of the vent filter, it has been determined that where liquid refluxes against the vent valve the operability of the system may be impaired. For example, if the liquid, such as urine, contacts the valve while it is open, the liquid may enter the valve and possibly contact the filter. In the course of time, this liquid results in a buildup of deposits in the valve, and significantly degrades its operability. Once the valve is functioning improperly, liquid may pass through the valve and the filter is damaged.

It is also desirable to prevent contact of the valve by the liquid when it is closed, since the liquid remaining on the valve may subsequently impair its operability.

SUMMARY OF THE INVENTION

A principle feature of the present invention is the provision of a vent for a liquid drainage system which prevents contact of a one-way valve in the vent by the drainage liquid, thus increasing the operable lifetime of the vent and system.

The vent of the present invention has the valve secured to an air chamber, and includes a passageway having one end connected to a lumen in the drainage system and the other end connected to the chamber. The valve opens to permit the passage of air into the chamber and lumen for venting, and closes to prevent passage of air from the chamber. The fluid, which drains in the lumen past the passageway, refluxes into the passageway responsive to a positive pressure condition in the lumen, and the refluxing liquid flow forces air from the passageway into the chamber to close the valve. Air is confined in the chamber by the closed valve, and the liquid flow compresses the confined air to develop a resistive pressure in the chamber.

A feature of the present invention is that the passageway has sufficiently small dimensions to permit only meniscal flow of the liquid therein and prevent the break up of a liquid column in the passageway.

Another feature of the invention is that the drainage system is operable independent of position of the vent.

A further feature of the invention is that the developed resistive pressure prevents the liquid from entering the chamber and contacting the valve.

Yet another feature of the invention is that the volume of the passageway relative to the volume of the chamber is sufficient for development of a resistive pressure which prevents flow of the liquid into the chamber.

Still another feature of the invention is that the vent may be removably attachable to the outside of a wall enclosing a fluid cavity.

Further features will become more fully apparent in the following description of the embodiment of this invention and from the appended claims.

DESCRIPTION OF THE DRAWINGS

In the drawings:

FIG. 1 is a fragmentary perspective view, partly in section and partly broken away, of the liquid drainage system and the vent of the present invention;

FIG. 2 is a fragmentary longitudinal section view of the vent of FIG. 1;

FIG. 3 is a sectional view taken substantially as indicated along the line 3—3 of FIG. 2;

FIG. 4 is a fragmentary longitudinal sectional view of another embodiment of the invention;

FIGS. 5A, 5B and 5C are fragmentary perspective views, partly in section or partly broken away, of alternate embodiments of the invention;

FIG. 6 is a perspective view, partly in section and partly broken away, of a movable vent of the present invention;

FIGS. 7 and 8 are fragmentary perspective views showing attachment of the movable vent of FIG. 6 to the wall of a tube;

FIG. 9 is a fragmentary sectional view on an enlarged scale, showing the needle and shroud of the movable vent prior to attachment;

FIG. 10 is a fragmentary sectional view on an enlarged scale, showing the needle and shroud of the movable vent during attachment;

FIG. 11 is a fragmentary perspective view, taken partly in section, of another embodiment of the invention.

DESCRIPTION OF THE PREFERRED EMBODIMENT

Although the vent of the invention is first described in a connection with an adapter for a catheter and liquid drainage tube in a urinary drainage system, it is understood that the invention has a broader scope, and may be included in various types of drainage systems. Additionally, the invention may be incorporated in the catheter or drainage tube itself.

Referring now to FIGS. 1–3, a liquid drainage system, generally designated 20, is shown including an adapter, generally designated 22, having one end 24 received in the proximal end 26 of a catheter 28 and a second end 30 which may be connected to a liquid drainage tube 32. The catheter 28 has a drainage lumen 34 extending from a drainage eye 35 adjacent its distal end 36 to the proximal catheter end 26, and the adapter 22 has a drainage lumen 38 extending between its ends 24 and 30. When the catheter is inserted into the body of a patient, liquid drains from the eye 35 to the tube 32 through the lumens 34 and 38.

The adapter 22 includes a vent, generally designated 40, for venting the drainage lumen 38. The vent 40 has an air chamber 42 and a passageway or channel means 44 having one end 46 connected to the lumen 38 and the other end 48 connected to the air or compression chamber 42. The passageway or venting channel 44 has sufficiently small cross-sectional dimensions to permit only meniscal flow of the liquid in the passageway, and the chamber 42 is preferably elongated and generally aligned with the lumen 38 for compactness of the adapter. The vent 40 also has a one-way air valve 50 located in the air chamber 42 and having one end 51 open to the atmosphere and connected to one end 52 of the chamber 42. A bacterial filter 54 is connected to the valve end 51 to prevent contamination of the drainage system due to air passing through the valve to the lumen 38.

In a preferred embodiment, the valve 50 is a flap valve and has an air inlet 55 positioned adjacent the other end of the chamber 56. However, it is contemplated that other one-way valves, such as ball or check valves, may be utilized in the vent 40. The flap valve 50 opens to permit passage of air into the chamber 42 for venting the lumen 38, with the direction of air flow being indicated by the arrows in the drawings, and closes to prevent the passage of fluid from the chamber into the valve and against the filter 54. Thus, the air valve or valve means 50 controls the passage of fluid between the atmosphere and the lumen 38.

During normal operation of the drainage system 20, and particularly when a negative pressure exists in the lumen 38, liquid drains in the lumen past the passageway or venting channel 44, and the lumen is vented to the atmosphere through the valve 50. Thus, any negative pressure in the lumen is relieved by the vent, and possible suction injury to the patient's body is avoided. Since the valve 50 is removed from the lumen 38 and air passes through the passageway 44 for venting, the drainage liquid does not contact the valve 50 during venting of the lumen.

However, occasionally a positive pressure, relative to the pressure in the chamber 42, may build up in the lumen, and liquid refluxes from the lumen 38 into the passageway 44 responsive to the pressurized condition. The passageway has sufficiently small dimensions such that the refluxing liquid forms a meniscus in the passageway which prevents the flowing liquid from breaking up, irrespective of the position of the vent 50 and passageway relative to the vertical. The meniscal flow forms a column of liquid in the passageway which forces air from the passageway into the chamber 42, and the valve is closed prior to contact by the liquid due to compression of air within the chamber. Accordingly, the liquid is prevented from passing into the open valve, and the chamber and meniscal forming passageway serve as means for closing the valve responsive to the flow of liquid into the passageway.

It is also desirable to prevent liquid from entering the chamber 42 at any time, since liquid in the chamber may enter the valve when it opens. Once the valve is closed and if the pressurized condition persists, the liquid column continues flowing in the passageway and forcing air from the passageway into the chamber. Since the air is confined in the chamber by the closed valve, the air is compressed and a resistive pressure to the flowing liquid is developed, with the compressed air acting as an air spring against the liquid column. Thus, the chamber, the closed valve or valve means, and the meniscal forming passageway serve as means responsive to the liquid flow for developing a resistive pressure to impede the flow of liquid into the passageway.

In order to protect the valve and filter from damage or contamination by the liquid, this principle is utilized to prevent the liquid from entering the chamber. The amount of resistive pressure developed in the chamber is dependent on: (1) the volume of the passageway, since this determines the amount of air which is forced into the chamber for a predetermined length of the liquid column, and (2) the volume of air space in the chamber. Accordingly, for a given pressure in the lumen, a passageway may be selected which has a sufficiently large volume relative to the volume of the chamber, in order for the compressing air to develop a pressure at least as large as the pressure of the liquid flow and prevent entry of the liquid into the chamber.

To achieve this result, preferably a relatively small chamber 42 is chosen for fast response of the valve in closing. Next, the possible range of positive pressures in the lumen is determined, and a passageway is selected which has a sufficiently large volume to prevent liquid from entering the chamber at the largest possible pressure in the range. However, the passageway is limited in width since it has meniscal forming dimensions, and the necessary volume may be attained by selecting the appropriate passageway length. To obtain the necessary length, the passageway may define a tortuous path between the lumen and chamber, such as by winding it around the chamber. In the adapter 22, the passageway is lengthened by including a mid-portion which, as well as the elongated chamber 42, is generally aligned with the linear drainage channel 38.

The relative volume of the channel 44 and chamber 42 which is necessary to prevent passage of liquid into the chamber may be derived as follows:

Let, $P$ = the pressure of the air in the channel and chamber prior to entry of liquid into the channel, or approximately atmospheric pressure;

$P'$ = the largest expected pressure in the channel and chamber of the confined air, which is also the largest expected pressure in the drainage lumen;

$V_1$ = the total volume of the chamber;

$V_1'$ = the volume of the chamber at the pressure $P'$;

$V_2$ = the volume of the channel with no liquid in the channel;

$V_2'$ = the volume of the air in the channel at the pressure $P'$; and $K = V_2'/V_2$, or a parameter such that $0 < K < 1$.

Now, according to Boyle's law, and assuming a constant temperature, $$PV = P'V', \text{ and}$$

$$P(V_1+V_2) = P'(V_1'+V_2'), \text{ or}$$

$$PV_1+PV_2 = P'V_1'+P'V_2'.$$

Since the volume of the passageway is selected such that the liquid does not enter the chamber, $V_1 = V_1'$, and, $$PV_1+PV_2 = P'V_1+P'V_2', \text{ or}$$

$$PV_2-P'V_2' = V_1(P'-P), \text{ and}$$

$$V_2(P-KP') = V_1(P'-P).$$

Thus, the relative volume of the passageway and chamber is, $$V_2/V_1 = (P'-P)/(P-KP').$$

Hence, once the volume of the chamber $V_1$ is selected, the range of pressure differences (P'−P) is known, and a desired ratio of $V_2'/V_2$ is chosen to determine how far the liquid should flow in the channel, the necessary minimum volume for the channel $V_2$ can be calculated by the expression, $$V_2 = V_1(P'-P)/(P-KP').$$

Also, since $V_2 = (A_2)(l_2)$, where $A_2$ and $l_2$ are the area and length of the passageway, respectively, the length of the passageway is $l_2 = V_2/A_2$. Of course, the actual volume $V_2$ will deviate slightly from this expression since a small amount of air is necessary to first close the valve. In the drainage system 20, the pressure difference (P'−P) may have an approximate range of values of 100 cm of water, or from 1034 cm of water, atmospheric pressure, to 1134 cm of water.

Although an expression has been given above for the volume of the channel $V_2$, this calculation determines only the minimum measurement of volume necessary to insure containment of the liquid within the passageway 44. Thus, the passageway 44 may have a greater volume and length than indicated by the expression, as there is no upper bound on the volume of the meniscal forming passageway. Also, it is contemplated that with a sufficiently small valve 50, the chamber 42 may be a continuation of the passageway 44 with their separation being indistinguishable.

Another embodiment of the invention is illustrated in FIG. 4, in which the vent 40 is secured to a liquid drainage system 20, such as a liquid drainage tube or an adapter for connecting a drainage tube to a catheter. The vent 40 has an outer wall 60 which surrounds a cavity 62, and the filter 54 and the valve 50 are connected to one end 64 of the wall 60. An inner wall 66 defines the passageway 44 which extends into the cavity 62, and separates the passageway from the chamber 42 in the cavity 62. Air passes through the valve inlet 55 into a blind pouch of the chamber 42, and from the pouch it enters the outer end of the passageway 44 and passes into the lumen 38.

Alternate embodiments of the invention are shown in FIGS. 5A, 5B and 5C, with the chambers 42 in these vents having different shapes to illustrate that the chamber may be shaped in any suitable manner, and with the passageways 44 having no maximum limit on their lengths. In FIGS. 5B and 5C the valve 50 is removed from the passageway by connecting the valve to one end of the chamber and connecting the passageway to the other end of the chamber. As shown in FIG. 5A, the one passageway end 46 is connected to the lumen 38, and the remote end of the passageway 48 extends into the chamber 42, thus increasing the length and volume of the passageway. Although the passageway extension is shown as integral with the chamber wall, alternatively, a separate tube may be utilized to extend the passageway. In FIG. 5C, a tube 70 is connected to the valve 50, and liquid passes from a fluid or liquid source (not shown) through the tube 70 and valve 50 into the channel 38, with the valve controlling the passage of fluid between the source and the channel. In FIGS. 5A and 5B, the source of fluid is the atmosphere or a gas.

Referring to FIGS. 6-10, a movable vent, generally designated 90, is shown having a case 92 which is removably attachable to the drainage system 20. In a preferred embodiment, the case 92 is attached to the outside of the wall 94 of a liquid drainage tube 96 in the system 20 to vent the tube lumen or cavity 38. However, it is understood that by a suitable choice of the attaching means, the case may be utilized for other types of fluid cavities by attaching the case to a wall which at least partially encloses the fluid cavity.

As shown in FIG. 6, the vent case 92 has an air chamber 42, a valve 50, and a filter 54, as previously described. As illustrated in FIGS. 6, 9 and 10, a connecting needle, generally designated 98, for penetrating the tube wall 94, has a base portion 100 secured to the case 92 and a tip 102 extending outwardly from the case. The needle has an internal meniscal forming passageway 104 extending from the base portion 100 to an external opening 106 in the needle adjacent the tip 102, but the passageway may terminate at the tip 102 itself, if desired.

The needle 98 has a sufficient length for the needle to penetrate the tube wall 94 and position the needle opening 106 in the lumen 38, and, preferably, the wall 94 of the tube 96 is sufficiently elastic such that the needle 98 may puncture the wall during attachment of the case 92. However, the vent may be attached to a relatively rigid wall, with an opening first being formed in the wall by other suitable means, such as by drilling, and the needle or needle means may then be inserted through the opening.

In order to lengthen the passageway 104, the case 92 has a tube 108 connected to the needle base portion 100 and extending into the chamber 42. The tube 108 has a lumen or passageway 110 connected to the needle passageway 104. When the case 92 is attached to the tube 96, the needle passageway 104 and tube lumen 110 define a channel communicating between the cavity 38 and chamber 42, with this channel having meniscal forming dimensions for operation like the passageway 44, as previously described. Thus, the needle 98 and the tube 108 serve as means for fluidly connecting the channel 38 and the chamber 42. During venting of the channel 38, air passes through the connecting means from the chamber to the channel 38, and fluid flows from the channel into the connecting means responsive to a pressurized condition in the channel to force air from the passageways 104 and 110 into the chamber 42 and close the valve 50.

As best illustrated in FIG. 9, a hollow flexible shroud 114 surrounds a longitudinal portion of the needle 98. The shroud 114 has one end 116 secured to the needle base portion 100 and a free end 118 which extends toward the needle tip 102. In a preferred embodiment, the shroud 114 has a sufficient length for the free end 118 to cover the needle opening 106 prior to attachment of the case. Accordingly, the shroud 114 closes the needle opening 106 when the vent is not in use, and protects the passageway 104 from contamination.

As shown in FIG. 10, during attachment of the vent the needle punctures a hole 120 in the wall 94, and the shroud 114 flexes toward the needle base portion 100 to seal the punctured opening 120 and prevent leakage. If desired, the attached vent may be removed from the tube 96, and the opening 120 is sealed by suitable means to continue operation of the drainage system 20.

As illustrated in FIG. 6, the case 92 has a plurality of opposed legs 124 extending outwardly from the case 92 to frictionally engage the outside of the wall 94 and attach the vent 90 to the tube 96. The opposed legs 124 are concave and aligned in pairs and may be resilient to grippingly receive the tubular wall. However, it is also contemplated that the legs 124 may be bendable for clamping the legs around the outside of the wall. As shown in FIGS. 7 and 8, the vent 90 is attached by pressing the case 92 against the tube 96 to puncture the wall 94 and engage the legs 124, and the legs thus serve as means for removably attaching the case 92 to the tube 96.

A similar embodiment is shown in FIG. 11, in which the case 92 is removed from the needle 98. The vent 90 has means for penetrating the tube wall 94, generally designated 126, which includes the needle 98 and the needle passageway 104 having one end terminating in an opening (not shown) adjacent the needle tip. The penetrating means 126 also has a plurality of legs 124 extending outwardly from a plate 128 to releasably retain the penetrating means to the tube 96, as discussed above. A tube 130 has one end 132 connected to the penetrating means 126 and the other end 134 connected to the case 92, and the tube 130 has a meniscal forming lumen 136 which communicates between the other end of the passageway 104 and the inside of the chamber 42. Thus, the tube 130 serves to lengthen the meniscal forming passageway and increase its volume, and if the environment in the area of the tube 96 is subject to wetting, the filter 54 is removed from the tube for protection.

The foregoing detailed description is given for clearness of understanding only, and no unnecessary limitations should be understood therefrom, as modifications will be obvious to those skilled in the art.

We claim:

1. In a liquid drainage system having a liquid drainage lumen, a vent from the atmosphere for said lumen comprising:
    an air chamber;
    a one-way valve operatively connected to said chamber, said valve opening to permit the passage of air into the chamber and closing to prevent the passage of fluid from the chamber;
    a channel fluidly connecting said chamber and lumen permitting the passage of air from the chamber to the lumen for venting the lumen with said liquid draining past the channel, said liquid refluxing from the lumen into the channel responsive to a positive pressure condition in the lumen relative to the pressure in the chamber, with said channel having sufficiently small dimensions to permit only meniscal flow of the refluxing liquid therein, and with the refluxing liquid forcing air from the channel into the chamber to close said valve prior to contact of the valve by the liquid; and
    a filter communicating with the valve remote the air chamber.

2. The vent of claim 1 wherein air is confined in the chamber by the closed valve, and said liquid flow compresses confined air in the chamber to develop a resistive pressure in the chamber for impeding said liquid flow in the channel.

3. The vent of claim 2 wherein the volume of the channel relative to the volume of the chamber is sufficient for the flowing liquid to develop a resistive pressure at least as large as the pressure of the liquid flow to prevent entry of the liquid into the chamber.

4. The vent of claim 3 wherein the volumes of the channel and chamber $V_2$ and $V_1$, respectively, are approximately related by the expression:

$$V_2/V_1 = (P'-P)/(P-KP'),$$

where,
    P is the pressure of the air in the channel and chamber prior to entry of liquid into the channel;
    P' is the largest expected pressure in the channel and chamber of the confined air; and
    K is a selected parameter, such that $0<K<1$.

5. The vent of claim 4 wherein the pressure P is atmospheric pressure.

6. The vent of claim 4 wherein the pressure difference (P'−P) has a value which ranges between 0 and 100 cm of water.

7. The vent of claim 4 wherein the parameter $K = V_2'/V_1$, and $V_2'$ is the volume of confined air in the passageway at the largest pressure P'.

8. The vent of claim 1 wherein said vent channel has one end connected to the drainage lumen and a remote end connected to the air chamber, said channel defining a tortuous path between the drainage lumen and the chamber.

9. The vent of claim 1 wherein said channel has one end connected to the drainage lumen and a remote end connected to the air chamber, said drainage lumen includes a generally linear portion in the region of said one channel end, and at least a portion of the channel is generally aligned with said linear lumen portion.

10. The vent of claim 1 wherein said vent channel comprises, a passageway having one end connected to the drainage lumen and a remote end extending into said air chamber.

11. A vent for a liquid cavity which is at least partially enclosed by a wall, comprising:
    a case having an air chamber;
    a one-way valve operatively connected to said air chamber for controlling the passage of air into the chamber;
    means for removably attaching said case to the outside of said wall relative to the cavity; and means fluidly connecting the cavity with the chamber of the attached case, said connecting means including a passageway for the passage of air from the chamber to the cavity for venting the cavity, with said liquid flowing from the cavity into the passageway responsive to a positive pressure condition in the cavity relative to the pressure in the chamber, and with said passageway having sufficiently small dimensions to permit only meniscal flow of the liquid therein, whereby the liquid forces air from the passageway into the chamber to close said valve prior to contact of the valve by the liquid.

12. The vent of claim 11 wherein said wall has a tubular shape with the fluid cavity being defined by a lumen in the tubular wall, and said attaching means comprises, a plurality of spaced legs extending outwardly from the vent case, said legs being opposed to frictionally engage the outside of the wall for attachment of the vent.

13. The vent of claim 12 wherein said opposed legs are aligned in pairs, said legs are resilient and concave to grippingly receive the tubular wall, and said attaching means includes a plurality of said leg pairs.

14. The vent of claim 12 wherein said opposed legs are bendable for clamping the case legs around the outside of the tubular wall.

15. The vent of claim 11 wherein said connecting means includes, means for puncturing the cavity wall during attachment of the case.

16. The vent of claim 11 wherein said connecting means penetrates the cavity wall through an opening in the wall, and including means for sealing said wall opening upon attachment of the case to prevent leakage.

17. The vent of claim 11 wherein said connecting means comprises, a needle having a base portion and a tip respectively secured to and extending outwardly from said case, said needle having a passageway extending from the base portion to an external opening in the needle adjacent said tip, and said needle having a sufficient length to penetrate the wall and position the needle opening in said cavity upon attachment of the case for connecting the cavity and chamber.

18. The vent of claim 17 including a hollow flexible shroud surrounding at least a longitudinal portion of the needle, said shroud having one end secured adjacent the base portion of the needle and a free end extending toward the needle tip prior to attachment of the case, said free shroud end flexing toward the needle base portion during attachment of the case to seal the wall adjacent the puncture.

19. The vent of claim 18 wherein said shroud covers the needle opening prior to attachment of the case.

20. The vent of claim 11 wherein said connecting means includes a channel communicating between the cavity and chamber after attachment of the case, said channel having sufficiently small dimensions to permit only meniscal flow of the fluid therein.

21. The vent of claim 20 including a tube extending into said chamber and having a lumen defining a portion of said channel.

22. The vent of claim 11 including a filter connected to said valve remote the chamber.

23. A vent for a fluid cavity which is at least partially enclosed by a wall, comprising:
a case having an air chamber;
a one-way valve operatively connected to said air chamber for controlling the passage of air into the chamber;
means for penetrating the cavity wall, including a passageway having one end communicating with the cavity after penetration; and
a tube having one end connected to the penetrating means and the other end connected to said case, said tube having a lumen communicating between the other end of said passageway and the inside of the chamber.

24. The vent of claim 23 including means releasably retaining the penetrating means in the cavity wall.

* * * * *